(Model.)

J. K. CLARK.
Stove Pipe Damper.

No. 236,985.  Patented Jan. 25, 1881.

Witnesses:
Jas. E. Hutchinson.
J. A. Rutherford

Inventor:
John K. Clark,
by James L. Norris.
Att'y.

UNITED STATES PATENT OFFICE.

JOHN K. CLARK, OF BUFFALO, NEW YORK.

STOVE-PIPE DAMPER.

SPECIFICATION forming part of Letters Patent No. 236,985, dated January 25, 1881.

Application filed July 29, 1880. (Model.)

*To all whom it may concern:*

Be it known that I, JOHN K. CLARK, a citizen of the United States, residing at Buffalo, in the county of Erie and State of New York, have invented new and useful Improvements in Stove-Pipe Dampers, of which the following is a specification.

My invention relates to that class of stove-pipe dampers shown in Patent No. 206,227, in which the damper consists of a circular disk with a detachable spindle. In the damper constructed under such patent a slot is formed in the disk continuously from a central opening in the same to the periphery of the disk, said slot following an angular course, in order to form three socket-pieces, which together constitute a socket for the damper-spindle. The objection to this form of damper is that, owing to the slot formed continuously through half of the disk, the latter is liable to warp and spring out of shape by the action of the heat to which the damper is exposed, and hence the socket-pieces will be so bent out of line with each other as to unfit the socket for the ready removal from or easy insertion of the spindle into the same. Under my improvement I dispense with this slot formed continuously from the center opening in the disk to the periphery thereof, and instead of said slot I form two separate openings between the central opening in the disk and the periphery of the latter, so that the metal between these two openings, and also between said openings and the central opening and the periphery of the disk, will be in the nature of three angular straps or socket-pieces, each united at two sides with the body of the disk, and all together constituting a socket for the damper-spindle. I also find that my improved form of damper can be molded much cheaper than the damper shown in the patent before referred to.

My invention consists in the damper-disk having a radial socket formed by three angular socket-pieces separated from each other by two separate and independent openings, in combination with the damper-spindle fitted in said radial socket, and formed at one end with a recess to receive an angular projection upon that socket-piece which is adjacent to the center of the disk.

It consists, further, in extending the inner socket-piece toward the center of an opening formed centrally in the disk, and providing said extended end with an angular projection to fit into the recess in the end of the damper-spindle, such extension of the said socket-piece being so formed that it will have the degree of spring required for the ready engagement or disengagement of the spindle and angular projection.

Figure 1:
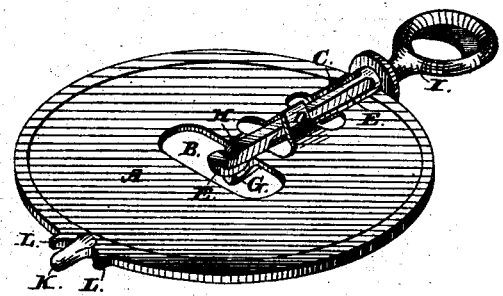
Figure 2:
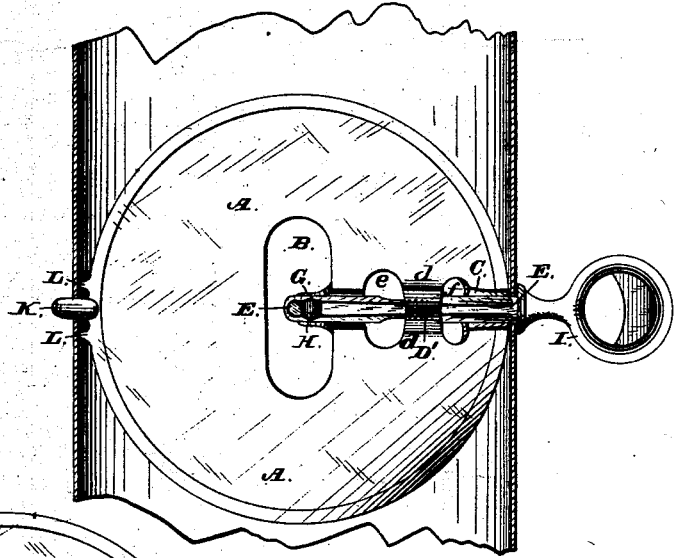
Figure 3:
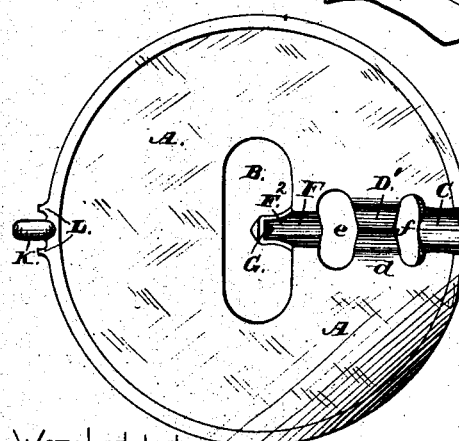
Figure 4:
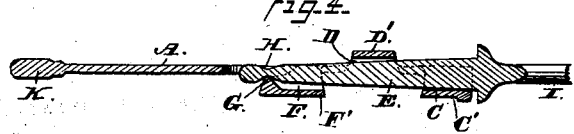

In the drawings, Figure 1 represents a perspective view of my improved damper with the spindle attached thereto. Fig. 2 represents a section of a stove-pipe, showing my improved damper applied thereto. Fig. 3 represents a top view of the blade of the damper with the spindle detached; and Fig. 4, a transverse sectional view of the blade with the spindle, taken longitudinally through the spindle.

The letter A indicates the blade of the damper, consisting of a circular disk of metal, preferably cast metal, formed with an opening, B, at its center. The said disk is formed with angular recesses C D on opposite sides, and also with a like angular recess, F, which said recesses constitute a radial socket, rectangular in cross-section, for the spindle E, which is of corresponding shape in cross-section. The angular socket-pieces C' D' F', which constitute the walls of these recesses, are cast solid with the disk A, and are separated from each other by the openings *e f*. It will be seen that these socket-pieces unite with the metal of the disk at their sides, as at *d d*, which letters indicate the points of juncture between the socket-pieces and the disk.

At or near the center of the damper, in line with the radial socket, is a short extension, F², formed with the socket-piece F', which is provided with an angular lip or projection, G, which serves to engage a recess, H, near the end of the spindle, to hold the same in place, the extension F² being extended to about the center of the opening B, and being so formed as to have a slightly-yielding or spring pressure, so as to spring into or out of engagement with the recess when the spindle is inserted or withdrawn with sufficient force. The spindle is formed with such recesses on opposite sides, so that it will be reversible, and may be inserted with either side up, and at its outer extremity is formed with handle I, having an elliptical opening through it for the passage of a current of air to prevent heating, and for the insertion of any suitable implement, such as a stove-plate lifter or the like, by means of which leverage may be obtained to shift the damper, should it from any cause become fixed in position too firmly to be moved by the handle of the spindle simply.

The spindle forms one of the journals of the damper, the other journal, K, being formed directly upon the disk at its periphery, diametrically opposite the radial socket and spindle. At each side of said journal K is formed a projection, L, which abuts against the stove-pipe around the bearing of the journal, and by the natural spring-pressure of the pipe serves to retain the damper in any position to which it may be adjusted.

The damper is inserted in the stove-pipe by placing the journal K in one of the apertures therein, and then inserting the spindle in its socket, the spindle being held, when forced fully home, by the angular projection near the center of the disk, which sets into the recess near the end of the spindle with sufficient spring-pressure to hold the spindle securely in place against accidental removal.

What I claim is—

1. In a stove-pipe damper, the disk A, having a radial spindle-socket formed by three angular socket-pieces, $C'$ $D'$ $F'$, united at their sides with the body of the disk and separated from each other by two separate openings, $e f$, in combination with the damper-spindle fitted in said radial socket, and formed at one end with a recess to receive an angular projection upon the inner socket-piece, $F'$, substantially as herein shown and specified.

2. In a stove-pipe damper, the combination, with the spindle E, formed with a notch or recess at its inner end, of the damper-disk A, having a radial socket formed by three angular socket-pieces, the inner end of the inner socket-piece, $F'$, being formed into an extension, $F^2$, extending to about the center of the disk, and being formed on its inner end with a lip or angular projection, G, adapted to engage the recess of the spindle, substantially as described.

In testimony whereof I have hereunto set my hand in the presence of two subscribing witnesses.

JOHN K. CLARK.

Witnesses:
JOHN A. FRANKE,
KIMBALL V. CLARK.